Dec. 9, 1952 — R. E. STANTON — 2,620,636
AIR CONDITIONING SYSTEM FOR AUTOMOBILES
Filed Jan. 3, 1950 — 2 SHEETS—SHEET 1
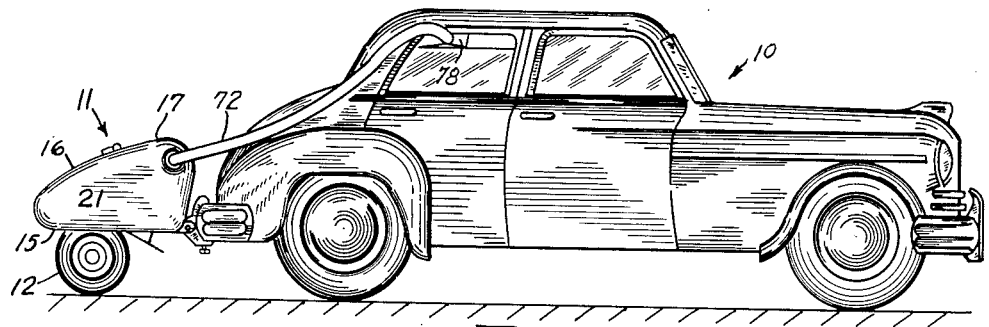
FIG. 1.
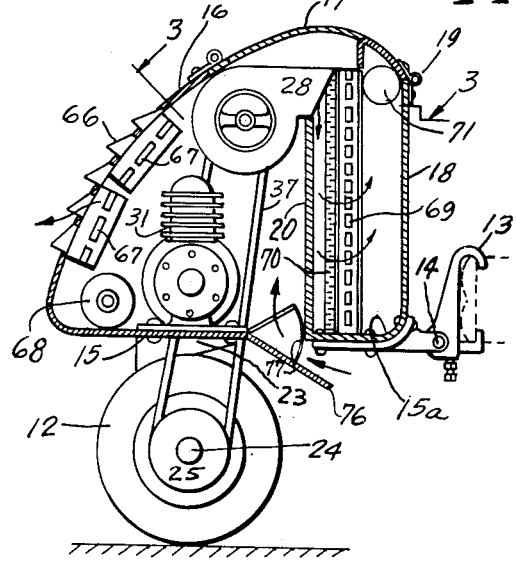
FIG. 2.
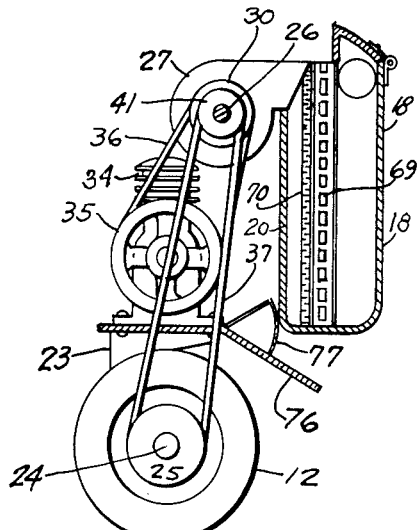
FIG. 4.
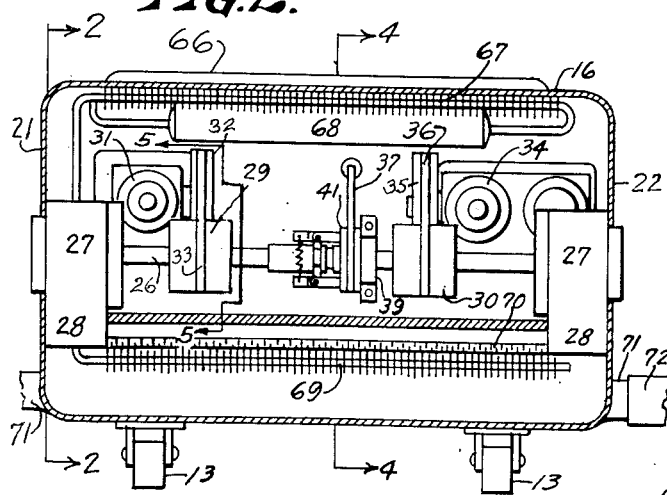
FIG. 3.
FIG. 5.
INVENTOR.
ROBERT E. STANTON
BY Anderson & Mueller
ATTORNEY Dec. 9, 1952  R. E. STANTON  2,620,636
AIR CONDITIONING SYSTEM FOR AUTOMOBILES
Filed Jan. 3, 1950  2 SHEETS—SHEET 2

INVENTOR.
ROBERT E. STANTON
BY Anderson & Mueller
ATTORNEY

Patented Dec. 9, 1952

2,620,636

UNITED STATES PATENT OFFICE 2,620,636

AIR CONDITIONING SYSTEM FOR AUTOMOBILES

Robert E. Stanton, Denver, Colo.

Application January 3, 1950, Serial No. 136,610

2 Claims. (Cl. 62—117.15)

This invention relates to improvements in air conditioning systems and has reference more particularly to a system for the air conditioning of the interiors of moving vehicles such as automobiles.

In many parts of the United States as well as in many foreign countries the temperature at certain seasons of the year reaches points so high that passengers riding on trains or in automobiles become very uncomfortable. Railway coaches and large buses have for some time been equipped with air conditioning devices or systems. Attempts have also been made to cool the interiors of ordinary passenger automobiles, for which purpose devices depending on the cooling effect obtained by evaporating water have been employed.

It is the object of this invention to produce a system for cooling the interiors of ordinary passenger automobiles, which preferably employs some form of mechanical refrigeration, but which may employ in lieu thereof Dry Ice or ordinary ice.

Another object is to produce an air cooling device, having the capacity necessary for effective operation, which may be carried by a small trailer and be connected with the interior of the automobile by conduits through which the cold air is moved by suitable blowers carried by the trailer.

A further object is to produce an air cooling device that can be combined with an automobile in such a way that power for operating the refrigerating mechanism and for the blowers is derived from the automobile engine when the automobile is traveling at normal speed.

A further object is to produce a cooling device or system of the type specified which shall be provided with an internal combustion engine that is normally idle when the automobile is traveling and which is automatically made operative when the automobile slows down below a minimum speed.

A further object is to supply cooled air to the interior of automotive type delivery vehicles and trucks for the protection of perishable materials against spoilage and deterioration during transit.

The above and other objects that may become apparent as the description proceeds are attained by means of a construction and an arrangement of parts that will now be described in detail, for which purpose reference will be had to the accompanying drawing, in which:

Figure 1 is a side elevation of an automobile showing an air conditioning unit combined therewith;

Figure 2 is a transverse section taken on line 2—2, Figure 3;

Figure 3 is a top plan view of the mechanism, the top 17 and sides having been removed down to section, line 3—3;

Figure 4 is a section taken on line 4—4, Figure 3;

Figure 5 is a section taken on line 5—5, Figure 3;

Figure 6:
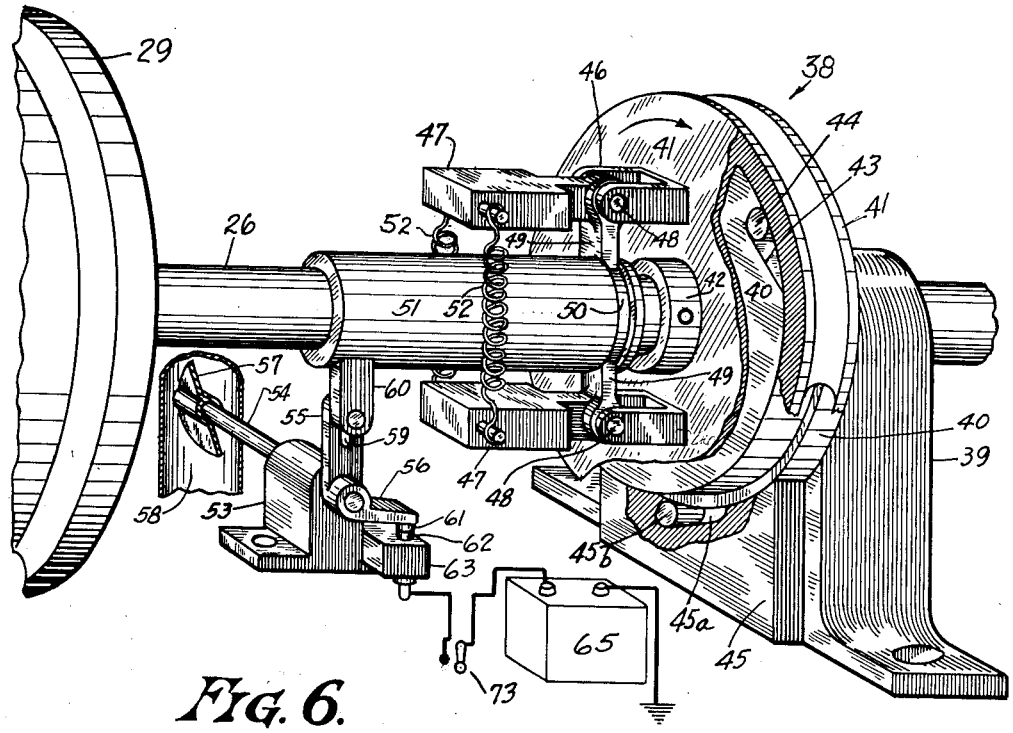
Figure 6 is a perspective view showing a detail of the construction.

In the drawing numeral 10 designates an automobile of the usual closed type and numeral 11 designates the air conditioning unit which is supported on a single wheel 12. The unit is attached to the rear bumper of the automobile by means of a pair of clamps 13 with which it has a hinged connection so that it may have a limited movement about pivots 14.

The unit consists of a housing having a bottom 15, a curved rear wall 16, a front wall 18, and a cover 17, hinged to the top of front wall at 19. The front wall may be formed from a piece of sheet metal different from the bottom 15 and bent into an inverted U-shape having a bottom portion 15a and a vertical wall 20. The housing has end walls 21 and 22.

The air conditioning unit is provided with a downwardly extending bracket 23 carrying a stub shaft 24 on which wheel 12 is supported for rotation. Wheel 12 is provided with a belt wheel 25 on one side.

Shaft 26 carries a Sirocco or similar type blower rotor at each end. The rotors are positioned in housings 27 which are provided with the usual bearing blocks, not shown. Housings 27 are attached to the inside of the end walls 21 and 22, as shown in Figure 3. The outlet openings 28 of the fan housing are positioned to deliver air to the space between walls 18 and 20.

Shaft 26 carries two solid cast iron cylinders 29 and 30 which rotate with the shaft and serve the double purpose of flywheels and as belt pulleys. A small internal combustion engine, whose cylinder has been designated by reference numeral 31, is secured to bottom 15 and is provided with a combined flywheel and pulley 32 that is connected with pulley 29 by a suitable belt 33. A gas pump or compressor, whose cylinders have been designated by numeral 34, has a pulley 35 to which power is transmitted from pulley or flywheel 30 by means of a belt 36.

Belt 37 transmits power from support wheel 12 to shaft 26 by means of an overrunning clutch mechanism 38 whose construction has been shown in Figure 6, to which reference will now be had.

Shaft 26 is journaled in a bearing 39 that is supported on bottom 15. The combined pulley and flywheel 29 is secured to shaft 26 on one side of bearing 39. A clutch disk 40 is fixedly secured to the shaft. A pulley 41 is rotatably mounted on the shaft and is held from longitudinal movement by a collar 42 or some equivalent means. Disk 40 is provided at its periphery with a plurality of notches 43 that taper in depth in the same direction in which the pulley rotates, balls or rollers 44 are positioned in the grooves. It is obvious that pulley 41, when it turns in the direction of the arrow, will be connected with disk 40 so that both rotate together and that shaft 26 may rotate in the same direction while pulley 41 remains stationary. In order that disk 40 and shaft 26 shall be free to rotate in one direction only, a ratchet mechanism has been provided to prevent reverse rotation. The ratchet mechanism illustrated consists of a block 45 having a tapered notch 45a in which is positioned a steel roller 45b. Notch 45 decreases in the opposite direction from that in which pulley 41 normally rotates and hence roller 45b will move toward the shallow end of the notch and prevent pulley 41 from turning in a direction opposite to the arrow. Since there are many specifically different one-way clutch mechanisms available, including the ordinary pawl and ratchet, it is to be understood that the one most suitable for the purpose may be selected and substituted for the one shown.

Pulley 41 has two diametrically located forked lugs 46. Centrifugal weights 47 are pivoted to the lugs at 48, as shown, and are provided with lateral fingers 49 that extend into and terminate in groove 50 of cylindrical sleeve 51 that is slideably mounted on the shaft. Springs 52 connect the weights, as shown in Figure 6. A bearing block 53 is attached to bottom 15 and a rod 54 is mounted thereon for rotation. One end of rod 54 carries a bell crank having arms 55 and 56 and the other end is attached to a butterfly throttle valve 57 located in the fuel intake pipe 58 of the engine. Arm 55 has a slot 59. Sleeve 51 has a lug 60 that carries a pin which projects through slot 59. Arm 56 carries an electric contact 61 that is movable in and out of electric contact making engagement with switch contact 62 that is carried by an insulating block 63. Switch 61, 62 is positioned in the ignition circuit of the engine, which circuit is of the usual type and has been indicated by rectangle 65. When pulley 41 is stationary or rotating very slowly the parts are in the position shown in Figure 6 in which the throttle valve 57 in open and the ignition circuit closed, and since the engine is connected to shaft 26 by belt 36, the piston is always moving in the cylinder, and therefore when the throttle valve is opened and the ignition switch is closed the engine will begin to function and deliver power to shaft 26.

Secured to the inner surface of housing wall 16, in line with louvers 66, is a condenser coil 67, composed of one or more sections. A refrigerant receiver 68 rests on bottom 15. A cooler coil 69 is positioned in the compartment formed by walls 18 and 20, and is separated from the exhaust openings of blowers 27 by a filter screen 70. End walls 21 and 22 are provided with openings 71 that communicate with flexible conduits 72, whose other ends are in communication with the passenger compartment of the automobile.

When the automobile is traveling, wheel 12 will rotate and turn shaft 26, which in turn operates the compressor 34, that receives gas from coil 69 and delivers it to the condenser where it is liquified, and from which it flows into receiver 68, from which it flows into coil 69 where it evaporates, all in the manner common in mechanical refrigeration systems.

When wheel 12 turns it rotates shaft 26, and the parts have been so proportioned that when the automobile is traveling above a certain speed the mechanical refrigerating apparatus is driven by wheel 12. When the speed of the automobile decreases to a point below said speed, the centrifugal device will open the throttle valve and close the ignition circuit, thus causing the engine to deliver power to the refrigerating apparatus.

It will be observed that there are two blowers of the type employing a rotor, and when shaft 26 rotates, the blowers receive ambient air and force it through the filter and between the coils of coil 69 and thence through conduits 72 to the interior of the automobile.

A manually operable control switch 73 is provided for the engine ignition circuit and positioned on the instrument board of the automobile or in any other suitable position so that the engine can be stopped when desired.

Figures 7, 8:
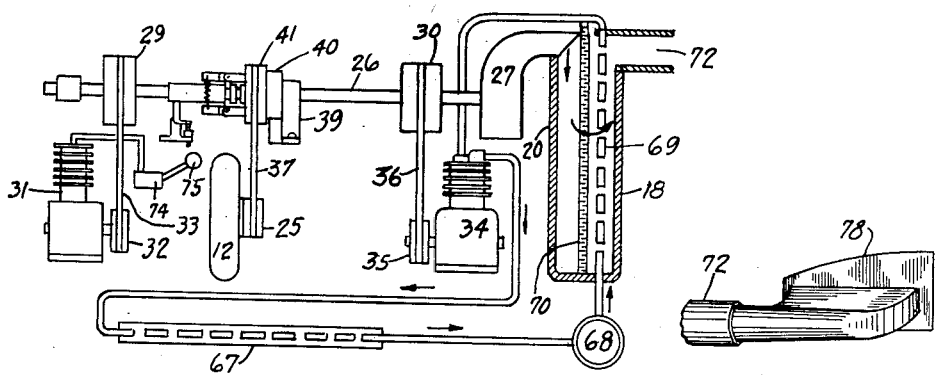
Figure 7 is a diagram showing the relationship of the several elements.
Figure 8 is a detail of a cold air grille.
Figure 9:
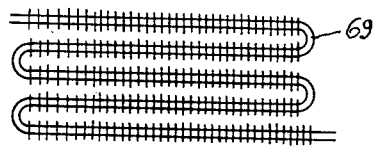
Figure 9 is a drawing showing the type of heat interchanger employed.

The engine is, of course, provided with a carburetor and a fuel supply which have been shown in Figure 7 and designated by numerals 74 and 75.

Pulleys 29 and 30 are massive and function as flywheels, in which sufficient energy is stored to keep the parts operating for a short time after wheel 12 slows down below a predetermined minimum, or after it stops suddenly, so that the engine will have time to begin operation.

In order to produce a flow of air through the trailer housing to expedite the dissipation of heat from the condenser 67, the bottom is provided with a pivoted scoop 76 that directs air into the housing through screen 77. The air that thus enters through the bottom leaves through louvers 66.

Figures 1 and 8 show how the cold air conduits are connected with the automobile. The conduits are connected with plates 78 that fit the window opening above the vertically adjustable glass panes, the latter being lowered to provide the necessary space.

Having described the invention, what I claim as new is:

1. A refrigerating device for effecting cooling a moving vehicle having a closed chamber, comprising a wheel mounted trailer frame, a mechanical refrigerator carried by the frame, a refrigerator drive shaft mounted on the frame for rotation, at least one fan operatively driven from the shaft, said refrigerator having a heat exchanger, means for rotating the shaft from the frame supporting wheel, comprising a belt driven by the supporting wheel, a pulley driven by said belt and mounted on the shaft for free relative rotation in one direction, a one way clutch positioned between the pulley and the shaft for effecting conjoint rotation of the pulley and the shaft when the pulley is rotated in the other direction, an internal combustion engine carried by the trailer frame, means comprising a belt for effecting conjoint rotation of the engine crankshaft and the first named shaft, a normally closed throttle valve and a normally open ignition switch operatively associated with the engine, means comprising a centrifugal device operatively connected with and responsive to the speed of the pulley for opening the throttle valve and closing the ignition switch when the speed of rotation of the supporting wheel driven pulley falls below a predetermined minimum, whereby the engine will be started to rotate the shaft, and conduit means connecting the outlet of the fan with the chamber to be cooled, said conduit means being arranged to pass the air into heat exchange contact with the heat exchanger.

2. A refrigerating device in accordance with claim 1 in which the heat exchanger is enclosed in a compartment so as to divide the same into two chambers and in which the air from the fan is introduced into said compartment on one side of the heat exchanger and from the other side of which a conduit extends to the chamber to be cooled.

ROBERT E. STANTON.

REFERENCES CITED

The following references are of record in the file of this patent:

UNITED STATES PATENTS

| Number | Name | Date |
|---|---|---|
| 1,401,786 | Kapferer | Dec. 27, 1921 |
| 1,943,317 | Hulse | Jan. 16, 1934 |
| 1,959,681 | Luhr | May 22, 1934 |
| 2,091,594 | Innes | Aug. 31, 1937 |
| 2,141,781 | Allen | Dec. 27, 1938 |
| 2,151,987 | Perrine et al. | Mar. 28, 1939 |
| 2,157,186 | Pinter | May 9, 1939 |
| 2,158,367 | Henny | May 16, 1939 |
| 2,185,034 | Melcher | Dec. 26, 1939 |
| 2,213,337 | Conlon | Sept. 3, 1940 |
| 2,227,257 | Henny et al. | Dec. 21, 1940 |
| 2,251,376 | Ross | Aug. 5, 1941 |
| 2,382,667 | Ryan | Aug. 14, 1945 |